United States Patent [19]
Chang et al.

[11] Patent Number: 5,057,997
[45] Date of Patent: Oct. 15, 1991

[54] INTERRUPTION SYSTEMS FOR EXTERNALLY CHANGING A CONTEXT OF PROGRAM EXECUTION OF A PROGRAMMED PROCESSOR

[75] Inventors: Tai-Lin Chang; Paul W. Hunter, both of San Jose; Donald J. Lang, Cupertino; Stephen G. Luning, San Jose, all of Calif.

[73] Assignee: International Business Machines Corp., Armonk, N.Y.

[21] Appl. No.: 310,409

[22] Filed: Feb. 13, 1989

[51] Int. Cl.[5] .................. G06F 9/46

[52] U.S. Cl. .................. 364/200; 364/241.5; 364/230.2; 364/247.2

[58] Field of Search .................. 364/200, 900 MS Files

[56] References Cited

U.S. PATENT DOCUMENTS

| | | | |
|---|---|---|---|
| 3,599,162 | 8/1971 | Byrns | 364/200 |
| 4,103,330 | 7/1978 | Thacker | 364/200 |
| 4,247,894 | 1/1981 | Beismann et al. | 364/200 |
| 4,257,096 | 3/1981 | McCullough et al. | 364/200 |
| 4,286,322 | 8/1981 | Hoffman et al. | 364/200 |
| 4,338,662 | 7/1982 | Yokoyama | 364/200 |
| 4,384,324 | 5/1983 | Kim et al. | 364/200 |
| 4,438,489 | 3/1984 | Heinrich et al. | 364/200 |
| 4,447,874 | 5/1984 | Bradley et al. | 364/200 |
| 4,636,944 | 1/1987 | Hodge | 364/200 |
| 4,658,351 | 4/1987 | Teng | 364/200 |
| 4,736,318 | 5/1988 | Delyani et al. | 364/200 |
| 4,805,107 | 2/1989 | Kieckhafer et al. | 364/200 |
| 4,914,657 | 3/1990 | Walter et al. | 364/200 |

*Primary Examiner*—Michael R. Fleming
*Assistant Examiner*—Debra A. Chun
*Attorney, Agent, or Firm*—Herb Somermeyer

[57] ABSTRACT

In a programmed machine, such as an peripheral controller, programmed operations are executed in a one of several operational contexts. Each context may be initiated by a corresponding interruption signal. Any context which has been activated remains active until quiesced by program execution. One of the active contexts is a current context in which all instruction executions are currently occurring. In each cycle of the programmed machine, all active contexts and received and stored interruption signals, each for respective ones of the contexts, are compared to find the context highest priority context. Such highest priority context is compared with the current context priority for determining whether or not the programmed machine should change current contexts.

7 Claims, 2 Drawing Sheets

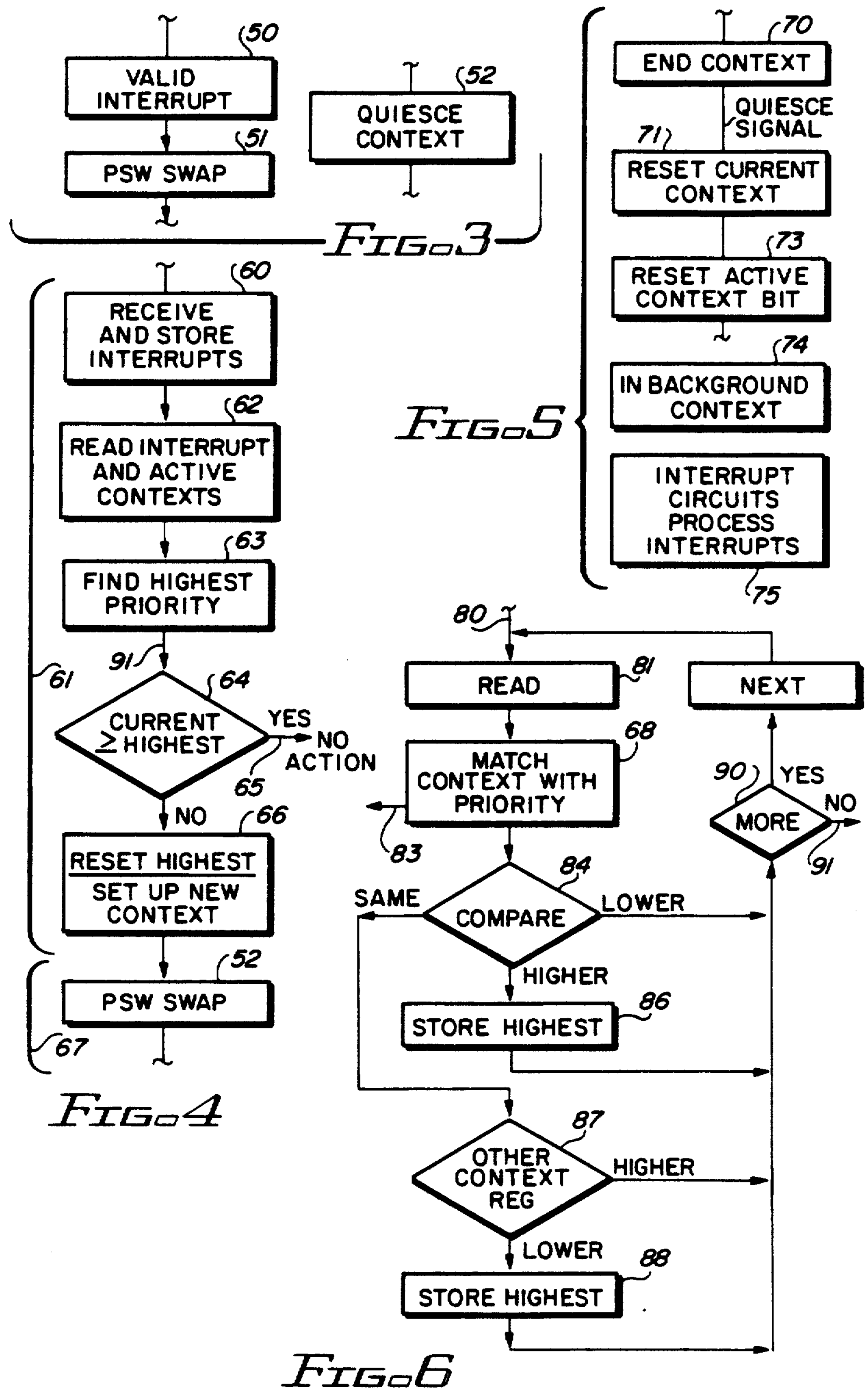

VALID INTERRUPT
50
PSW SWAP
51
QUIESCE CONTEXT
52
FIG. 3
END CONTEXT
70
QUIESCE SIGNAL
RESET CURRENT CONTEXT
71
RESET ACTIVE CONTEXT BIT
73
IN BACKGROUND CONTEXT
74
INTERRUPT CIRCUITS PROCESS INTERRUPTS
75
FIG. 5
RECEIVE AND STORE INTERRUPTS
60
READ INTERRUPT AND ACTIVE CONTEXTS
62
FIND HIGHEST PRIORITY
63
91
61
CURRENT ≥ HIGHEST
64
YES
NO ACTION
65
NO
RESET HIGHEST
SET UP NEW CONTEXT
66
PSW SWAP
52
67
FIG. 4
80
READ
81
NEXT
MATCH CONTEXT WITH PRIORITY
68
83
90
YES
MORE
NO
91
COMPARE
84
SAME
LOWER
HIGHER
STORE HIGHEST
86
OTHER CONTEXT REG
87
HIGHER
LOWER
STORE HIGHEST
88
FIG. 6

INTERRUPTION SYSTEMS FOR EXTERNALLY CHANGING A CONTEXT OF PROGRAM EXECUTION OF A PROGRAMMED PROCESSOR

FIELD OF THE INVENTION

The present invention relates to programmed machines, particularly to those programmed machines having interruption facilities. Such programmed machines may be peripheral controllers for data processing machines

DISCUSSION OF THE PRIOR ART

Programmed machines of all types have included both internal, external and programmed interruption facilities. Some of the facilities have had fixed priority of interruptions, such as round robin interruption priorities and the like. Other interruption facilities have provided variable priorities of interruption.

Peripheral controllers typically have used a fixed priority of interruption which is either plugged into the controller in a plugboard (also referred to as a pinboard) or is wired into the electronic circuitry. In such controllers, the position of connection of peripheral machines indicate priority and connections of internal circuits indicate their respective priorities.

Thacker in U.S. Pat. No. 4,103,330 shows a data processing apparatus having a priority interruption encoder 28. The interruption encoder receives interruption or wake up requests from I/O controllers. This encoder encodes the interrupt requests into a 4-bit quantity which in turn is applied to a current task register 36. This quantity indicates the current highest priority outstanding request. Such priority is fixed by the electronic circuits of the encoder 28 illustrated in this document. It is desired to provide a more flexible and effective interruption evaluation and processing.

Byrns in expired U.S. Pat. No. 3,599,162 shows an interruption handling apparatus have a plurality of interruption tables. Each table can store a plurality of received interrupt requests all of which have the same priority; each table storing interrupts of different priorities. Apparently the interrupt requests in any given table are handled on a FIFO basis. As such, the FIFO selection within a table is a tie breaking function between interrupt requests having the same priority.

Yokoyama in U.S. Pat. No. 4,338,662 shows a microinstruction interruption control in which microinstructions which are interrupted are stored in a stack, apparently in accordance with their priority ratings. The interrupted microinstruction executions are resumed whenever the interrupting microinstruction finishes. This scheme also appears to use a fixed priority.

Hodge in U.S. Pat. No. 4,636,944 shows a multi-level priority microinterrupt controller. Only one interrupt signal for each of the interrupt levels can be active at one time. A higher priority interrupt causes the controller to stack the currently interrupted instruction for enabling the interrupted instruction to be resumed when the interruption has been completed.

Branigin et al in U.S. Pat. No. 4,358,829 show a dynamic rank ordered scheduling mechanism. The mechanism allows insertion of elements into a list of positions determined by the rank of the elements and allows deletion of elements only from the top of the list. The arrangement provides for dynamic aging of the priorities of the elements in the list.

None of the above-discussed documents suggest a flexible but efficient interruption procedure or apparatus which is based upon an executing context, which enables quiescing any active context, whether executing or not, and for tie breaking between any interrupts for contexts having the same priority of interruption.

SUMMARY OF THE INVENTION

It is an object of this invention to provide an interruption control in which the executing program of instructions needs no awareness of the current executing context priority nor the priority of any active context which is not currently executing.

It is another object of this invention to enable altering priority of the interruption by the state of the context as opposed to the identity of the context.

It is a further object of this invention to enable an interrupt control to manage a programmed processor in accordance with its indicated highest priority interrupt context.

In accordance with the invention, interruption signals are analyzed for determining whether or not a programmed processor is to be interrupted. The machine establishes a plurality of operational contexts for the programmed processor together with primary and secondary priorities of interruptions for each of the contexts.

A means stores one or more interruption signals which indicate requests for interruption of the processor operation for changing instruction execution to a context corresponding to the stored interruption signals, respectively. The machine also maintains an indication of all active contexts in which the programmed processor may or may not be currently executing instructions and identification of the current context in which the programmed processor is executing instructions. During predetermined cycles of operation of the programmed processor, means compare all of the active contexts and stored interruption signals with each other including ascertaining the primary and secondary priorities of each for indicating a highest priority active context or interruption signal. The highest priority of the indicated highest priority active context or interruption signal with the current context in both primary and secondary priorities and interrupting the programmed processor when the indicated highest priority active context or interruption signal is higher than the priority of the current context.

The foregoing and other objects, features, and advantages of the invention will be apparent from the following more particular description of preferred embodiments of the invention, as illustrated in the accompanying drawings

DESCRIPTION OF THE DRAWINGS

FIG. 3 is a simplified flow diagram showing response to a valid interrupt and program initiated context quiescing in the FIG. 1 illustrated processor.

FIG. 4 is a simplified machine operations chart showing operation of the FIG. 2 illustrated apparatus.

FIG. 5 is a simplified machine operations chart showing context quiescing when using the FIG. 2 illustrated context manager.

FIG. 6 is a simplified machine operations chart illustrating finding the highest priority active context or context related to an interruption signal by the FIG. 2 illustrated context manager.

DETAILED DESCRIPTION

Figure 1:
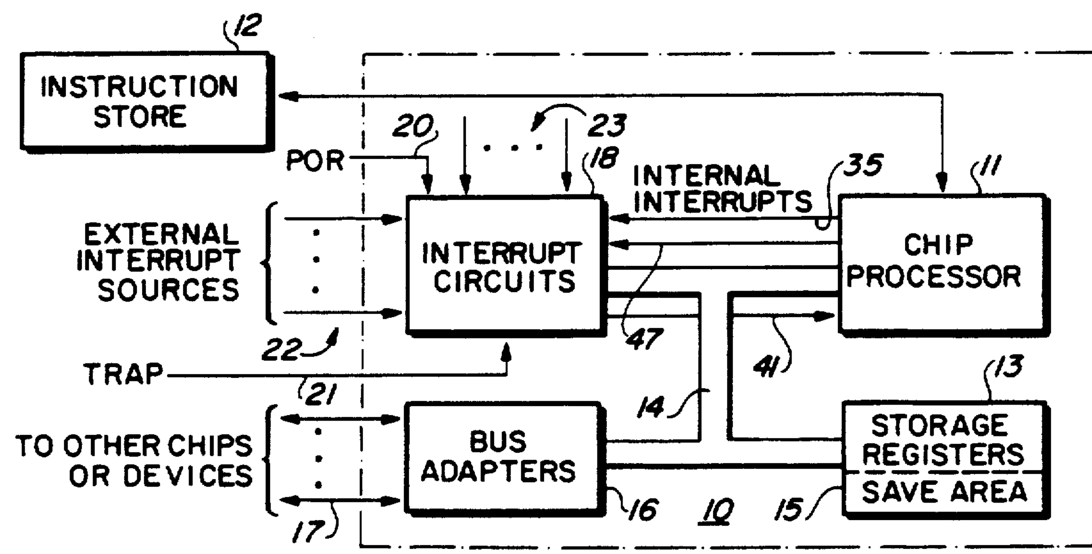
FIG. 1 is a simplified block diagram of a programmed processor for use in a peripheral controller and which is incorporated into a single semiconductor chip.

Referring now more particularly to the appended drawing, like numerals indicate like parts and structural features in the various figures. FIG. 1 illustrates a programmed processor system which is a part of a peripheral controller (not shown) integrated into a single semiconductor chip 10. The system includes a chip processor 11 which consists of microprocessor circuits of any usual design. An instruction store 12 is located off-chip and is accessible by processor 11 for fetching instructions to be executed. A set of storage registers 13 (which can be a RAM) in chip 10 are connected to chip processor 11 over inchip bus 14. Bus 14 has the usual plurality of electrical conductors, as is known, some of the conductors carry data signals while other conductors carry tag or control signals. Such an arrangement can also be considered as two buses, a data bus and a control bus. Registers 13 act as a local store for processor 11. Included in registers 13 is a program save area 15 used as later described for program storage word (PSW) swaps. A plurality of bus adapters 16 operatively connect inchip bus 14 to a plurality of other functional chips (such chips, not shown, operatively connect the respective bus adapters 16 to other functioning chips which in turn are connected to host processor channels, peripheral devices and the like) on a circuit board (not shown), to other circuit boards (not shown) or other devices (not shown) as may be appropriate. Interrupt circuits 18 are connected to in-chip bus 14 for communication with chip processor 11 for interrupting the operation of same, as is known in the art. Interrupt circuits 18 receive diverse program execution interrupting signals. A highest priority of interrupt, which is fixed in the illustrated embodiment, is a power on reset (POR) received over external chip connection 20 from an external source (not shown) indicating that a power reset is occurring. Another external interrupt of fixed highest priority is a trap signal received over external chip connection 21. The response of chip processor 11 to these two types of interruptions is known. A set of external interrupt input chip connections 22 connect other chips, such as referred to above and which are connected to one or more of the data buses 17 over which the processor system on chip 10 communicates. A set of chip internal interrupt inputs 23 also go into circuits 18. The present invention relates to the handling of all of the above-identified interruption signals and managing the context in which chip processor 11 executes streams of instructions.

Figure 2:
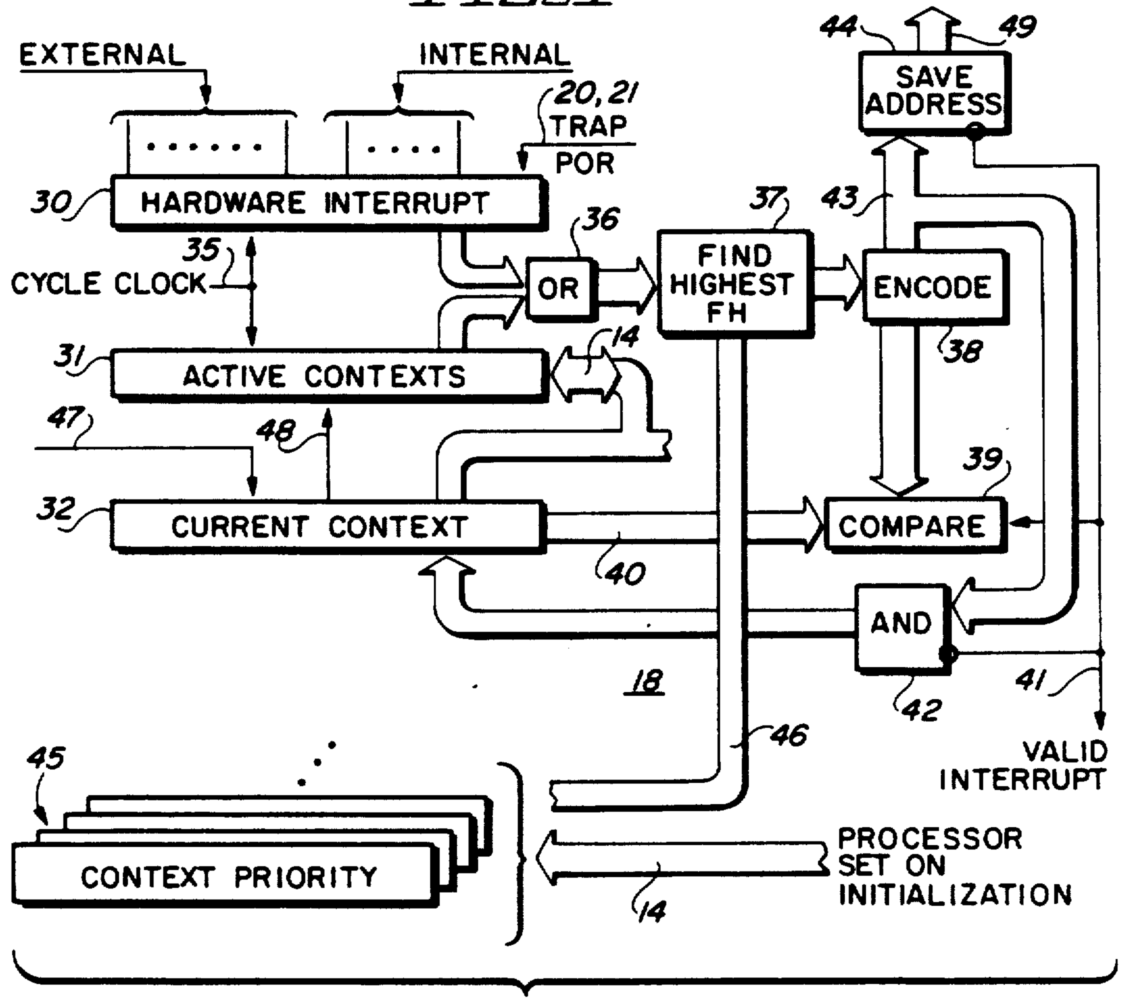
FIG. 2 diagrammatically illustrates a context and interrupt control or manager for use in the FIG. 1 illustrated programmed processor.

FIG. 2 is a simplified showing of interrupt circuits 18. Hardware interrupt register 30 is a double-rank register which asynchronously receives interruption request signals in a first rank (not shown). Register 30 is a phase-hold register which holds its signal contents for one interrupt evaluation cycle; about one cycle of machine operation. The interrupt signals inputted to the register 30 either can remain active until the interrupt is honored or can be reissued each machine cycle until the interrupt is honored. Each time a cycle of chip processor 11 reaches a predetermined elapsed time from the beginning of a cycle, the request signals in a first rank (not shown) of register 30 are transferred to its second rank (not shown). The later-described circuits effectively scan the second rank of register 30 for reading the received interrupt requests. There is one bit position in register 30 corresponding to a respective context, as will become apparent.

Chip processor 11 executes in only one context of a plurality of possible contexts. Each of the contexts may be set up and entered into by chip processor 11 under the management and control of interrupt circuits 18. The priority of interrupt is set, as later described, by program or software means. Such setting during a context execution reflects the current state of the context. That is, a designer can incorporate into the programming or software controls beyond the present description which alter the interrupt priorities in accordance with the design. The FIG. 2 illustrated apparatus and system enable this flexibility. Also, the executing program of chip processor 11 has no need to know which of the contexts it is executing in nor how may nor which contexts are active (work is still to be done in those context which are active). All of this control and management is performed by interrupt circuits 18 with minimal software interaction in chip processor 11. Active context register 31 stores identifications of all the currently active contexts. Such identifications are bit positions in the register which correspond to the respective context; one bit per context. A set bit indicates the corresponding context is active while a reset bit indicates the corresponding context is not active, i.e. quiesced. This storage includes the currently executing active context, such executing context is also identified by a corresponding bit being set in current context register 32, as will become apparent. Processor 11 sets and senses the contents of active context register 31 via bus 14 while later-described circuits set current context register 32; that register can be sensed or written to by chip processor 11. The later-described valid interrupt handling and quiescing context handling included chip processor 11 such that it updates the contents of active context register 31; this action does not imply that program execution within a given context requires any information as to which contexts are active.

At a predetermined point in each cycle of chip processor 11 operations, a cycle clock signal from processor 11 travels over line 35 to actuate the register 30 second rank and the active context register 31 to transfer a copy of their respective contents through a set of logic-OR circuits 36, each such logic-OR circuit merges like positioned bits of the two registers, i.e. bit signals logically associated with the same context, and passes the merged bit signals to find highest circuit 37, hereafter FH circuit 37. FH circuit 37 staticizes the merged bit signal in a suitable register (not shown) for later-described processing. Such processing identifies which of the merged bit signals (either active context or interrupt request) have the highest found priority of interruption. Following identification of the highest priority active context or received request, FH circuit indicates to encode circuit 38 which bit (i.e. which context) has the highest priority for a priority comparison between the identification of the current context of register 32 priority. Firstly, the bit is encoded by encode circuit 38 into an address quantity identifying the save area 15 address which is to store the PSW for the identified highest found priority. Compare circuit 39 receives the bit indicating the current context over bus 40 from register 32. Compare 32 encodes the bit into save area 15 address for the current context. The save area 15 addresses for the context PSW's are arranged in a predetermined order. When compare circuit 39 finds the address from encode circuit 38 is different from the address received from current context register 32 and the highest found interrupt has a higher priority than the current context priority, a valid interrupt signal is generated. The valid interrupt signal is supplied over line 41 to chip processor 11. Substantially simultaneously, the contents of current context register 32 are updated via AND circuits 42 as enabled by the valid interrupt signal to the context associated with the found highest priority. Alternately, chip processor 11 may update the contents of current context register 32 to reflect the upcoming PSW swap. Also address register 44 is enabled to receive the new save area 15 address for enabling chip processor 11 to effect a known PSW swap between the two contexts, the interrupting and interrupted contexts. At this time the active context register 31 is updated via bus 14 by chip processor 11 to reflect honoring the interrupt which activates a quiesced context. The bit position in the register 30 second rank corresponding to the interrupting context (found highest-priority context) is reset by the phase-hold time expiring.

The operation of FH circuit 37 combines the identification of the contexts received from registers 30,31 with assigned context priorities stored in the context priority registers 45. Preferably during system initialization (such as POR), chip processor accesses the registers 45 via bus 14 for setting same to initially and dynamically assign priorities to the contexts. The dynamic assignment reflects the current state of the current executing context. In some instances the current executing context may not dynamically change all of the context priorities; then some of the context priorities may still reflect the state of an earlier executing context which has either finished or was interrupted. Each of the registers 45 have a predetermined number of bit positions, one bit position for each of the contexts. The lower number the bit position in each register, the higher the priority that position indicates. The lowest numbered and highest numbered bit positions are not settable, such positions are respectively reserved for traps and for background processing. During a POR the contents of registers are cleared requiring chip processor 11 to again establish initial assigned priorities. The lowest numbered bit which is set in the respective registers 45 indicate the priority for the corresponding context. If no bit is set in any one register, then that context has no priority assigned, i.e. if no external unit is attached which would cooperate with such a context or for some reason the interruption by a context is to be inhibited or masked for reasons beyond the present description, then erasing or not setting the respective one of the registers 45 effectively masks out interrupts intended for that context. In various ones of the context priority registers, some of the bit positions may not be allowed to be assigned to such context; this control masks certain priorities from a context, such selections are a matter of design choice. FH circuit 37 for each of the active contexts and stored interrupt requests received via logic-OR circuits 36, accesses the respective one of the context priority registers 45 for ascertaining the priority assigned to the context. The scan of registers 45 reveals which of the contexts being evaluated that has the highest assigned priority to enable FH circuit 37 to emit the above-described signal to encode circuit 38. It is to be understood that several designs and procedures may be employed for evaluating the priority scanning within circuit FH 37. The FIG. 6 machine operations chart illustrates the logic design of FH circuit 37.

The software interaction of chip processor 11 with the interrupt processing is shown in FIG. 3 in extremely simplified form. In responding to a valid interrupt signal on line 41, chip processor 11 in step 50 responds to the line 41 signal to read register 44 in preparation for a PSW swap in the next machine cycle at step 51. No instruction is fetched from instruction store 12 for step 51. Following step 51 in the second machine cycle of the interruption processing, chip processor 11 is operating in the interrupting context. When chip processor 11 has completed processing for a given context, that context is quiesced at step 52. In this step, chip processor 11 supplies a quiesce signal over line 47 to interrupt circuits 18 to set current context register 32 to background processing (cleared) and reset the associated active bit in active context register 31 such that during the cycle of circuit 18 operation any current highest priority active context or received interrupt request is able to become the interrupting context, all as above described. Line 47 carries the quiesce signal for clearing current context register 32. Line 48 represents reseting the associated bit in active context register 31. In other words, the software executing in chip processor 11 merely initiates the quiescing of a context.

The general machine operations of FH circuit 37 are shown in FIG. 4. Machine step 60 represents the asynchronous receipt of interrupt requests by register 30. In a first machine cycle 61, in time coincidence with software machine step 50, circuits 18 perform the next described machine steps. At step 62 circuits 18 receive the outputs of logic-OR circuits 36 as the input signals from interrupt register 30 and active context register 31. At step 63, circuits 18 find which of the contexts, if any, represented by the received input signals, has the highest assigned priority. Then at decision step 64 (corresponding to compare circuit 39 operation), whether the highest assigned priority measured in step 63 is greater than the priority level of the current executing context is measured. If the current priority level is higher than or equal to the found priority level, then no action is taken as indicated by line 65, i.e. no valid interrupt signal is generated. When the current context's priority is not higher than or equal to the found priority, then at machine step 66 the bit position in the second rank of register 30 is reset and a valid interrupt signal is supplied over line 41 to "set up new context". Then in the next ensuing machine cycle 67, chip processor performs the known PSW swap at step 52.

FIG. 5 is a machine operations chart illustrating, in simplified form, quiescing a context. At machine step 70, chip processor determines to end a context. This context is usually the currently executing context indicated in register 32, no limitation thereto intended. Extending from step 70 is a line representing the quiesce signal on line 47. In the next machine step 71 the line 47 quiesce signal resets current context register 32. In machine step 73 the corresponding active bit in active context register 31 is reset (see line 48 in FIG. 2) by the quiesce signal travelling over line 47. Processor 11 can reset the active bit via bus 14. In machine step 74 the processor 11 is in background (lowest priority level) context. Then in machine step 75, interrupt circuits 18 again find the highest priority active context or interrupt as above described. It is to be understood that processor 11 can set register 32 during the PSW swap step 52 rather than having the setting being accomplished using electronic circuits. Also processor 11 could set current context register 32 to the background level (lowest priority) during machine step 70 but before any action is taken for setting current context register 32 by circuits 18; it is preferred to relieve processor 11 of such activities.

The machine operations of FH circuit 37 is next described with respect to FIG. 6. Operations are initiated as indicated by line 80. Read step 81 captures the outputs of logic-OR circuits 36. In the match interrupt-/context with priority step 82, POR-trap bit is examined on the first pass of the operations. If it is set, then the machine operations follow path 83 to set up a valid interrupt signal by actuating encode 38 and other circuits to operate as above described. If POR-trap is not set, then the next bit position of the FH circuit 37 holding register (not shown) is sensed. If set, the corresponding register 45 is sensed for obtaining the assigned priority level. At machine step 84, the sensed priority level is compared with the contents of a one-byte register (not shown) used to store the highest level of priority yet sensed in this cycle of operation. During the first pass, the contents of the one-byte register is the highest number representing background processing. It also could be set to the priority of the current context. Compare circuit 39 only provides for a valid interrupt signal if the found highest priority is greater than the current priority level. In any event, if the compare at step 84 finds the priority of the context being examined is lower than the priority in the one-byte register, then later-described housekeeping operations occur. When compare step 84 finds the priority of the context being examined is a higher priority than the contents of the one-byte register, then at step 86 the priority of the context being examined and the context identification is stored in a one-byte register. If at compare step 84 the compared priorities are equal, then at machine step 87 the address of the context register 45 (context number, not priority) and the context register 45 address for the context identified in the one-byte register are compared. As a tie-breaker operation, the context having the lowest register 45 address (lowest context number) is determined to have the highest priority, a fixed second level evaluation of priority to allow multiple contexts to be assigned a like priority level. When the address of the context being evaluated is higher, then later described housekeeping operations occur. Otherwise, when the address of the context being evaluated is lower (higher priority), then that address and priority level are stored in a one byte register at step 88. The housekeeping operations begin from any of the steps 84, 86, 87 or 88. In step 90, it is determined whether or not more contexts/requests received from registers 30, 31 have to be examined. If not, machine operations proceed to step 64 over line 91. The next bit, identified at step 92, from the input signals is then obtained at step 81 and the loop of operations repeat until it is determined that all of the set bits received by FH circuits 37 have been examined. The found highest information is then transferred by FH circuit 37 to encode 38.

While the invention has been particularly shown and described with reference to preferred embodiments thereof, it will be understood by those skilled in the art that various changes in form and details may be made therein without departing from the spirit and scope of the invention.

What is claimed is:

1. In apparatus for controlling a programmed processor using context control means external to the programmed processor for indicating to the programmed processor which stream of a plurality of streams of instructions is to be executed, including, in combination:

interrupt means external of the programmed processor for storing indications of interruption signals which respectively indicate requests for possible changes of operating context for the programmed processor;

said context control means having active context means external of and being connected to the programmed processor for addressably storing indications of all contexts that are currently active for the programmed processor;

said context control means having a current context means external to and being connected to the programmed processor and for storing an identification of a current context in which the programmed processor is executing a stream of program instructions;

priority means in said active context means for storing context priorities;

said context control means having find means being operatively connected to said priority means for receiving the context priorities for finding a one of said indications which indicates a context having a highest priority;

interrupt validating means external of the programmed processor and being connected to the find means, to the priority means and to the current context means for comparing the priorities between the highest priority context indicated by said find means with the priority of the current context means for indicating a valid interrupt signal if the find means indicated priority is higher than the current context priority;

said context control means having responding means external of the programmed processor and being connected to the interrupt validating means for responding to the valid interrupt indication for changing the current context in the current context means to be a one of the active contexts having said highest priority whereby the programmed processor begins executing instructions in said one of the active contexts; and activating means external of the programmed processor and being connected to said programmed processor for receiving timing signals therefrom and connected to all of the above recited means for actuating all of said means to determine whether any one of the stored indications of the interruption signals represents a valid interrupt for changing the current context in synchronism with operation of the programmed processor.

2. In the apparatus set forth in claim 1 further including, in combination:

said priority means having an address means for each of the contexts, each of the address means indicating an address unique to the respective contexts and each such indicated address also indicating a secondary priority of the respective active context;

said active context means having a plurality of context register means, each of the context register means storing a primary context priority indication of the respective active context; and means in the find means responsive to a given plurality of the context register means having identical stored primary context priority indications for comparing the addresses in said address means for the given plurality of contexts having said identical stored primary context priority indications and selecting a one of the given plurality of contexts having an address in the address means with a highest value as the context with a highest priority between the given plurality of contexts.

3. In the apparatus set forth in claim 2 further including, in combination:

said active context means, said current context means and said context registers of said priority means being addressable by said programmed processor such that the contents of the active context means, current context means and the priority means are settable by programming of the programmed processor.

4. In the apparatus set forth in claim 3, further including, in combination:

end context means operatively connected to the active context means, to the current context means and to the find means for actuating the active context means to erase an indication of the current context from the active context means and for actuating the current context means to erase its contents; and the end context means further being further operative for actuating the find means to then identify a remaining highest priority context or stored interruption signal indication and being connected to said interrupt validating means to actuate the find means identified highest priority context as a new current context.

5. In the apparatus set forth in claim 4 further including, in combination:

electronic circuit means connected to the programmed processor, said electronic circuit means comprising said interrupt means, said context control means, said interrupt validating means, said responding means and said activating means such that all context control of program execution of the programmed processor is effected by said electronic circuit means externally to said programmed processor.

6. In a machine-effected method of processing interruption signals for determining whether or not a programmed processor is to change from executing instructions in a current context to executing instructions in any one of a plurality of active contexts wherein the operating contexts are indicated to the programmed processor by external electronic circuits for controlling the programmed processor to execute any one of a plurality of program instruction sequences, each one of said program instruction sequences being in a respective one of the contexts, including the machine-executed steps of:

indicating externally of the programmed processor a plurality of the contexts for the programmed processor as active contexts;

indicating externally of the programmed processor primary and secondary context-selection priorities for each of the contexts;

actuating the programmed processor to execute program instructions in one of the active contexts and terming the one active context a current context;

indicating externally of the programmed processor one or more requests for interruption of the processor operation for changing instruction execution to a one of said contexts, making each of said interruption requests correspond respectively to a one of the active contexts, assigning to each one of the interruption requests a priority equal to the primary priority of its respective corresponding active context;

maintaining eternally to the programmed processor an indication of all the active contexts in which the programmed processor may execute program instructions and identification of the current context in which the programmed processor is currently executing instructions;

during predetermined cycles of operation of the programmed processor, comparing externally to the programmed processor all of the active contexts and stored interruption requests with each other including ascertaining the primary priorities of each for indicating a highest primary priority active contexts or interruption signals;

comparing externally to the programmed processor the indicated highest priority active context or interruption request with a primary priority of the current context;

detecting externally to the programmed processor whether or not a given plurality of the active contexts have a same highest primary priority; if yes, then externally to the programmed processor comparing the secondary priorities of said plurality of active contexts and externally to the programmed processor selecting the active context having a highest one of the secondary priorities as an active context having a highest priority of interruption; if no, selecting the active context indicated by the highest primary priority as an active context having a highest priority of interruption; and externally to the programmed processor, each time the indicated highest priority active context or interruption signal is higher than the primary and secondary priorities of the current context, selecting a new current context in which the programmed processor is to operate beginning with a next one of the cycles of the programmed processor.

7. In the machine-effected method set forth in claim 6, further including the machine-executed steps of:

quiescing the current context, then externally of the programmed processor selecting the active context or interruption request having a highest primary and secondary priority as a new current context.

* * * * *